3,149,961
PROCESSING OF MANGANIFEROUS ORES
Olav Moklebust, Stamford, Conn., assignor to R-N Corporation, New York, N.Y., a corporation of Delaware
Filed Sept. 27, 1961, Ser. No. 141,141
4 Claims. (Cl. 75—80)

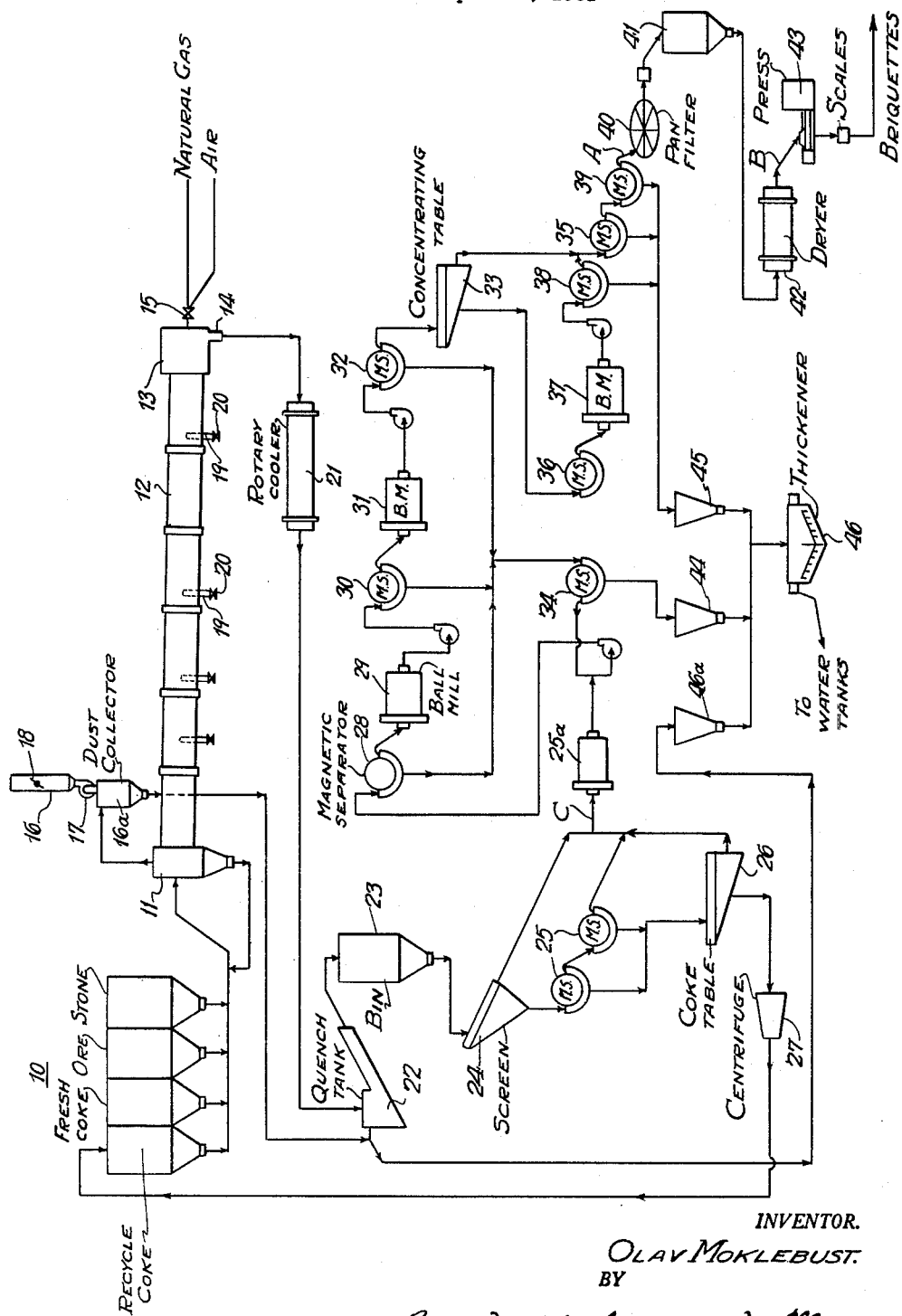

This invention pertains to methods of recovering metallic manganese in high yield from manganese-containing ores, and more specifically from manganiferous ores, i.e., manganese and iron containing ores. The invention also pertains to methods of reducing manganiferous ores and separately recovering manganese and iron values in the metallic state and in high yield therefrom.

In my Patent 2,829,042, I have described a process for low temperature metallization of iron ores with subsequent isolation and concentration of the iron values, wherein the metallization is carried out in a rotary kiln in the presence of a solid carbonaceous reductant, such as coke or char, and in an atmosphere of combustible gases and a controlled amount of oxygen, such that the reduction is effected without fusion and at temperatures on the order of 1000–1100° C., depending on the reducibility of the ore.

I have now discovered that if manganese-containing iron ores are thus reduced, the manganese values are affected by the treatment in such manner that on subsequent magnetic separation and concentration, a substantial and usually a major portion of the manganese values are retained in the non-magnetic fractions in such form that they may be leached out in high yield with a dilute solution of sulphuric acid for some ores or, alternatively, with a dilute solution of sulphuric and hydrofluoric acids for other ores, from which, in either case, the manganese can be electrolytically recovered as metal.

In manganese-containing iron ores, the manganese can be present in different forms. Sometimes it is present as free, higher oxides or carbonates, such as $MnO_4$, $Mn_2O_3$, $MnO_2$, $MnCO_3$, etc. In other instances, it may be present in the same lattice as iron, for example as $(Mn, Fe)Ox$. In other cases the manganese is present as silicates, such as $MnSiO_3$, $MnSiO_4$, etc.

When such manganiferous ores are reduced by the rotary kiln process of my aforesaid patent, the manganese which is present in the same lattice as iron, will accompany the iron on subsequent magnetic separation and concentration of the reduced ore, and will thus be concentrated together with the iron in the metallic iron concentrate. On the other hand, manganese which is present in the ore as free oxides or carbonates, will be reduced in the kiln to the divalent oxide state MnO, which is non-magnetic, and which therefore on subsequent magnetic concentration of the reduced ore, will go with the non-magnetic coke-waste and tailings fractions, from which the divalent manganese oxide can be extracted with dilute sulphuric acid. The manganese silicates, being non-magnetic, will also be concentrated in the non-magnetic fractions. I find, however, that they are not readily soluble in dilute sulphuric acid but require for extraction in high yield a dilute solution of sulphuric and hydrofluoric acids.

In the following examples, the invention is illustrated as applied first to the processing of manganiferous ores in which the manganese is present principally in the form of oxides and/or carbonates, and secondly, to such ores in which the manganese is present principally in the form of silicates.

*Example I*

A manganiferous ore containing about 33.1% iron and 23.2% manganese, present predominantly as oxides and/or carbonates, was reduced according to the process of my aforesaid patent. After reduction the metallized ore was separated from the non-magnetic coke-waste fraction (lime, ash, coke, gangue, etc.) by screening and magnetic separation, and subjected to wet stage grinding and magnetic separation, yielding a final metallic iron concentrate containing 93.0% iron and 2.3% manganese, the latter comprising 3.6% of the manganese present in the original ore. The manganese thus carried over with the iron product, may have been originally in the same lattice as the iron oxide. The tailings from the wet stage grinding and magnetic separation were found to contain 80.6% of the total manganese present in the original ore. These tailings were leached with a cold 5% aqueous solution of sulphuric acid, and the manganese recovery found to be 97.6%, or 78.6% of the manganese present in the original ore. The coke-waste fraction was found to contain 15.8% of the manganese present in the ore. On subjecting this fraction to a wet density, gravity separation, it was found that the aforesaid manganese content was split equally between the coke and waste fractions, i.e., 7.9% in each. On leaching the waste fraction with 5% cold $H_2SO_4$, additional manganese was thereby recovered to give an over-all recovery of about 88% of the manganese present in the original ore.

*Example II*

An ore containing about 35% iron and 4.9% manganese, present substantially as oxides and/or carbonates, was processed in the same manner as in Example I. The final iron concentrate contained 91.7% iron and 1.2% manganese. The tailings from the wet stage concentration contained 82.3% of the manganese contained in the ore, of which 93.5% was soluble in cold 5% sulphuric acid. The manganese recovered in this way was, therefore, 79.6% of that present in the original ore. The waste from the coke gravity separation, contained 5.5% manganese, of which 96.5% was soulble in 5% sulphuric acid as aforesaid. This recovery was 9.6% of the manganese present in the ore. Thus a total of 89.2% of the manganese in the ore was recovered.

*Example III*

The procedure was the same as in the previous examples, the ore processed containing about 52.7% iron and 5.5% manganese, present substantially as oxides and/or carbonates. The final iron concentrate contained 95.6% iron and 0.8% manganese. Of the total manganese present in the ore, about 92.5% was diverted to the wet stage tailings and the waste fraction from the coke gravity separation, from which a total of 88% was recovered in the manner aforesaid, or 81.5% of the total manganese present in the ore.

The above examples demonstrate that when the manganese is present principally in the form of oxides and/or carbonates, recovery of the manganese values in high yield are obtained by extraction with dilute sulphuric acid. The following examples, however, show that this is not so with respect to ores in which manganese is present predominantly as silicates of the metal.

*Example IVa*

An ore containing about 50% iron and 2% manganese was processed as in Examples I–III, inc., yielding a metallic iron concentrate containing 92% iron and 0.7% manganese. This manganese was originally in the same lattice as the iron oxide. The non-magnetic tailings from the wet stage concentration, were found to contain 7% manganese, the major part of which was in the form of silicates or pseudo-silicates. The tailings were leached with 5% sulphuric acid solution with results as follows:

Head sample _____ 6.92% mn.
Sample #1—Extracted manganese  16.6% Mn recovery.
Sample #2—Extracted manganese  15.3% Mn recovery.
Sample #3—Extracted manganese  15.2% Mn recovery.

The manganese thus extracted corresponded to the manganese present in divalent free oxide form. In order to extract the manganese in silicate form, a small amount of hydrofluoric acid was added to the solution with the following results:

*Example IVb*

Four (five gram) samples of tailings were treated with different amounts of a 5% aqueous solution of $H_2SO_4$ and varying concentrations of hydrofluoric acid. The samples were digested for 10 minutes at 103° C. After filtration, the manganese dissolved in the filtrate was determined by titration with results as follows:

Head sample _____ 6.92% Mn.
Test #1—5 grams, 100 cc.–5%
  $H_2SO_4$, 1 cc. HF _____ 81.5% Mn recovery.
Test #2—5 grams, 75 cc.–5%
  $H_2SO_4$, 7 cc. HF _____ 88.4% Mn recovery.
Test #3—5 grams, 50 cc.–5%
  $H_2SO_4$, 5 cc. HF _____ 84.1% Mn recovery.
Test #4—5 grams, 25 cc.–5%
  $H_2SO_4$, 3 cc. HF _____ 81.8% Mn recovery.

These test results illustrate the great effect of a small amount of HF in dissolving the manganese in sulfuric acid. The recovery of manganese in the filtrate was better than 80% as compared with only 15% without HF. It should also be noted that the amount of HF used was far less than the theoretical amount required to dissolve the silicates present in the tailings which also contained calcium silicates and calcium aluminum silicates.

The acid digestion conditions are preferably carried out with an aqueous solution of about 3–10% sulphuric acid and about 1–5% hydrofluoric acid by volume where the latter is required. The coke-waste and tailings fractions are digested with a sufficient quantity of the acid solution to extract the manganese oxides and/or silicates present, according to conventional leaching techniques. Ordinarily digestion with the acid solution for about 5–15 minutes at about 80–100° C. suffices where HF is required.

Referring to the annexed drawing comprising a simplified flow sheet of the ore reduction and subsequent concentration sequences, the ore, coke and limestone if required, are fed from bins 10 through the feed end housing 11 of a rotary kiln furnace, and thence into the rotary kiln unit 12, through which the charge progresses during reduction to the delivery end housing 13, from whence the reduced ore is discharged, as at 14. The delivery end housing is provided with a burner 15, for introducing a fuel, such as natural gas, and a limited amount of air, insufficient completely to burn the fuel.

The gas flow is countercurrent to the ore-coke feed, passing out of the stack 16 through a dust collecting cyclone 16a, the stack being provided with an exhaust fan 17, and damper 18, for regulating the draft. As described in said Moklebust patent, the kiln is penetrated by spaced air tubes, as at 19, extending to the kiln axis and opening thereat in the axial direction of the kiln indicated. The exterior ends of these tubes mount air inlet valves, at at 20, for regulating the temperature and combustion conditions throughout the kiln, as described in said patent for effecting optimum reduction without fusion, at temperature of about 1000–1200° C., which reduces the iron of the ore to the metallic state and the manganese oxides and carbonates in the ore to the non-magnetic divalent form MnO.

The reduced ore discharged 14, is fed through a water-cooled cooler 21, and from thence is water quenched in a tank 22. It is then conveyed to a storage bin 23 from the base of which it is fed onto a screen 24, the fines through which are magnetically concentrated by the magnetic separators 25, the magnetic or metallic iron containing fraction from which is fed thence to a ball mill 25a for wet stage grinding, to which the coarse reject from the screen is also fed. The non-magnetic coke-waste fraction from the separators 25 is fed to a coke table 26 where it is subjected to a wet density, gravity separation. The coke fraction thus separated is recycled through a centrifuge 27 to the recycle coke bin at 10, while the waste fraction is fed to the ball mill 25a, as shown.

The output from the ball mill 25a is fed to a magnetic separator 28, the iron concentrate from which is fed thence successively to ball mill 29, magnetic separator 30, ball mill 31 and magnetic separator 32, and thence to a gravity concentrating table 33. The rejected fractions from separators 28, 30 and 32 are fed to a magnetic separator 34, the iron concentrate from which is recycled through the grinding and separating system 28–32, incl.

The iron concentrate from table 33 is fed to a magnetic separator 35, while the magnetic fraction of the residue is fed thereto through the separating and grinding circuit 36, 37, 38. From separator 35 the iron concentrate is fed to the magnetic separator 39, thence to a filter 40 for dewatering and recovery of the metallic iron concentrate, which is conveyed thence into a storage bin 41, from the base of which it is passed through a dryer 42 and into a hydraulic press 43 wherein it is pressed into briquettes. The tailings from the separators 34–36, 38 and 39, which contain the manganese oxide and/or silicate values, are fed to the tailings cones 44, 45, and thence into a settling tank 46. Also the dust from collector 16a is fed to the settling tank through a cone 46a. The concentrate of the settling tank 46 is extracted with a dilute aqueous solution of sulphuric and/or sulphuric and hydrofluoric acids, depending on the character of the ore being processed, for extraction and recovery of the manganese values in the manner above described.

What is claimed is:

1. The method of recovering manganese from manganiferous ores, which comprises: reducing said ore in the presence of a gaseous reducing agent at a temperature of about 1000–1100° C. until the iron values are substantially all reduced to the metallic state without fusion, separating the reduced ore into magnetic and non-magnetic fractions, and extracting the non-magnetic fraction with a dilute aqueous solution of sulphuric and hydrofluoric acids for recovery of manganese values.

2. The method of recovering manganese from manganiferous ores, which comprises: reducing said ore in the presence of a reducing agent at a temperature of about 1000–1100° C. until the iron values are substantially all reduced to the metallic state without fusion, separating the reduced ore into magnetic and non-magnetic fractions, and extracting the non-magnetic fraction with an aqueous solution of about 3 to 10% sulphuric acid and 1 to 5% hydrofluoric acid by volume, for recovery of manganese values.

3. The method of recovering metallic manganese from manganiferous ores, which comprises: reacting said ore with a reducing agent at temperatures of about 1000–1100° C. until the iron values are substantially reduced to the metallic state, separating the magnetic and non-magnetic fractions, extracting the latter with a dilute aqueous solution of sulphuric and hydrofluoric acids, and recovering manganese in metallic state from the resulting solution.

4. The method of recovering metallic manganese from manganiferous ores, which comprises: reducing said ore in the presence of a solid carbonaceous reductant and in an atmosphere of hot combustible gases and a sufficient amount of free oxygen-containing gas to burn the combustible gases and to reduce the iron values in said ore to the metallic state without fusion and at temperatures of about 1000–1100° C., separating the magnetic and non-magnetic fractions, and extracting the latter with a dilute solution of sulphuric and hydrofluoric acids, and recovering metallic manganese from the resulting solution.

References Cited in the file of this patent

UNITED STATES PATENTS

| | | |
|---|---|---|
| 1,349,322 | Clevenger et al. | Aug. 10, 1920 |
| 2,026,683 | Johannsen | Jan. 7, 1936 |
| 2,737,441 | Nossen | Mar. 6, 1956 |
| 2,829,042 | Moklebust | Apr. 1, 1958 |
| 2,860,965 | Ruelle et al. | Nov. 18, 1958 |